United States Patent [19]

Otani et al.

[11] Patent Number: 5,727,522
[45] Date of Patent: Mar. 17, 1998

[54] METHOD AND SYSTEM FOR CONTROLLING IGNITION TIMING FOR INTERNAL COMBUSTION ENGINE

[75] Inventors: Asahiko Otani, Mito; Masayoshi Hayasaka, Hitachinaka, both of Japan

[73] Assignee: Hitachi, Ltd. and Hitachi Car Engineering Co., Ltd., Japan

[21] Appl. No.: 824,554

[22] Filed: Mar. 25, 1997

[30] Foreign Application Priority Data

Mar. 25, 1996 [JP] Japan ................ 8-068375

[51] Int. Cl.⁶ .................................................. F02M 3/00
[52] U.S. Cl. ............................................... 123/339.11
[58] Field of Search ................... 123/339.11, 339.19, 123/339.23, 422, 406, 417, 418; 364/431.04

[56] References Cited

U.S. PATENT DOCUMENTS

| Re. 32,030 | 11/1985 | Yano et al. | 364/431.04 |
|---|---|---|---|
| 4,181,104 | 1/1980 | Shinoda | 123/102 |
| 4,240,145 | 12/1980 | Yano et al. | 364/431 |
| 4,446,832 | 5/1984 | Matsumura et al. | 123/339 |
| 4,506,639 | 3/1985 | Murakami et al. | 123/339.11 |
| 4,508,075 | 4/1985 | Takao et al. | 123/339.11 |
| 4,696,272 | 9/1987 | Kato et al. | 123/339.11 |
| 4,732,125 | 3/1988 | Takizawa | 123/422 |
| 4,884,540 | 12/1989 | Kishimoto et al. | 123/339.11 |
| 5,445,124 | 8/1995 | Tomisawa et al. | 123/339.11 |
| 5,497,745 | 3/1996 | Cullen et al. | 123/339.11 |

FOREIGN PATENT DOCUMENTS

| 63-302177 | 12/1963 | Japan | 123/339.11 |
|---|---|---|---|
| 58-176470 | 10/1983 | Japan | 123/339.11 |
| 58-190572 | 11/1983 | Japan | 123/339.11 |
| 58-202373 | 11/1983 | Japan | 123/339.11 |
| 60-17254 | 1/1985 | Japan | 123/339.11 |
| 62-170776 | 7/1987 | Japan | 123/339.11 |
| 3-47472 | 2/1991 | Japan | 123/339.11 |
| 5-1656 | 1/1993 | Japan | 123/339.11 |

*Primary Examiner*—Raymond A. Nelli
*Attorney, Agent, or Firm*—Evenson, McKeown, Edwards & Lenahan, P.L.L.C.

[57] ABSTRACT

In a control system for an ignition timing of an internal combustion engine and a control method for the ignition timing, a basic ignition timing of the engine is set, an engine speed is detected, a target value of the engine speed is set while the engine is in idling condition, an ignition timing correction amount is determined depending upon a difference of the target value and a detected engine speed while the engine is in idling condition, the basic ignition timing is corrected with the correction amount, and after the engine speed becomes higher than or equal to a predetermined value, the engine is controlled with the corrected ignition timing.

36 Claims, 13 Drawing Sheets

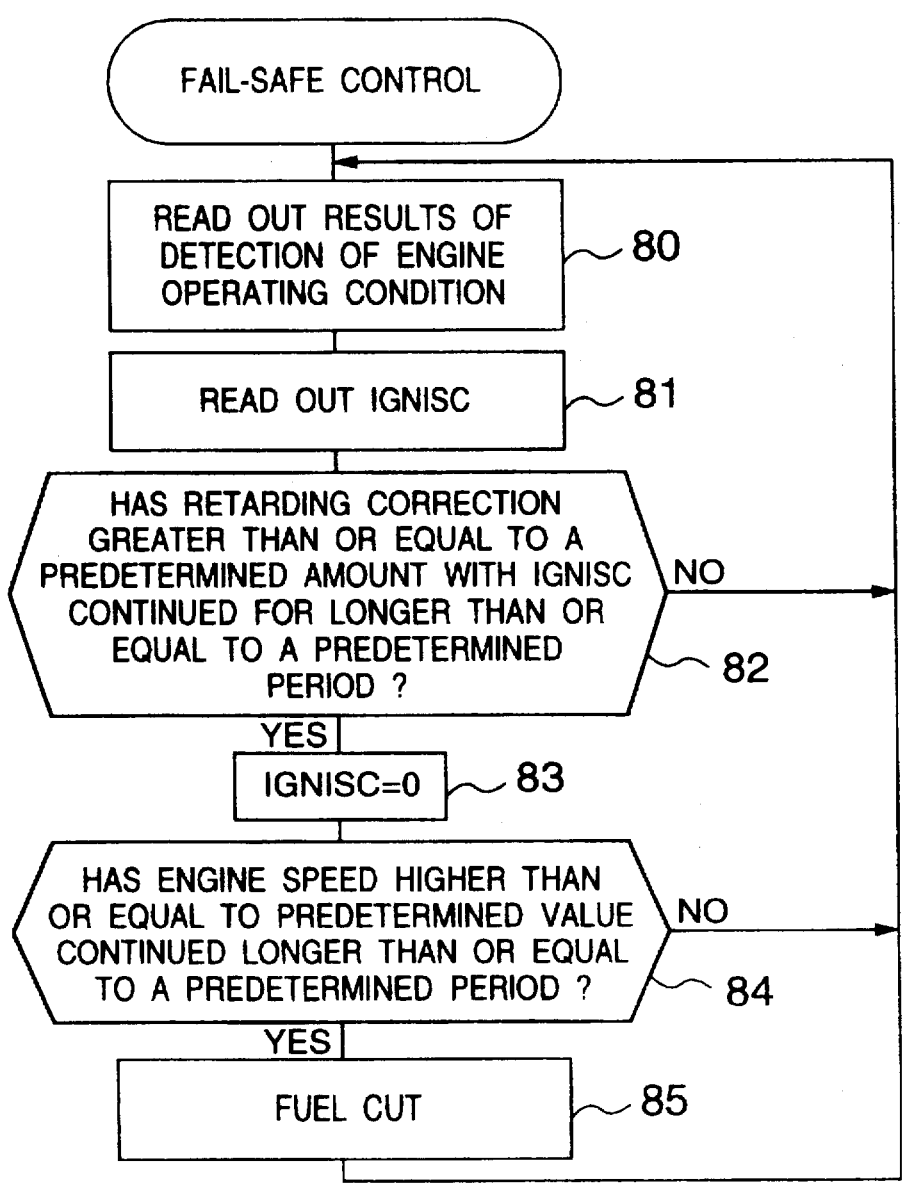

METHOD AND SYSTEM FOR CONTROLLING IGNITION TIMING FOR INTERNAL COMBUSTION ENGINE

BACKGROUND OF THE INVENTION

The present invention relates generally to a ignition timing control system for an internal combustion engine. More specifically, the invention relates to a system and a method for controlling and engine speed of an internal combustion engine by a ignition timing.

Conventionally, in an internal combustion engine of an automotive vehicle, a device for driving a throttle valve and a throttle bypass valve (an idling control valve) disposed within an auxiliary air passage bypassing the throttle valve are provided. During an engine idling state, an instant engine speed and a target engine speed are compared. There are a lot of control systems for the internal combustion engines. Depending upon results of comparison, the throttle valve and the throttle bypass valve are driven for adjusting an air induction amount to be supplied to the internal combustion engine and whereby feedback controlling the engine speed toward the target value.

For example, U.S. Pat. No. 4,181,104 to Shinoda, U.S. Pat. No. 4,240,145 and U.S. Pat. Re. No. 32030 both to Yano et al. disclose examples of idling control systems. However, in case of only air flow rate control, such as those systems disclosed in the above-identified U.S. Patents, delay in control is inevitable due to transfer delay of intake air per se and to capacity of an air induction passage. As a result, the engine speed cannot be converged to the target engine speed, quickly. Thus, there has been a proposal for quickly converging the engine speed to the target engine speed by correcting a ignition timing.

For example, U.S. Pat. No. 4,446,832, to Matsumura et al., Japanese Unexamined Patent Publications (Kokai) Nos. JP-A-58-176470, JP-A-58-190572, JP-A-58-202373, JP-A-60-17254 and so forth, propose means for correcting the ignition timing depending upon the result of comparison of the instant engine speed and the target engine speed. In these prior art, when the engine speed is lower than the target value, the ignition timing is advanced to increase the engine speed. However, when correction of the ignition timing is effected from starting-up of the internal combustion engine, the following problems are encountered. Namely, upon starting-up of the internal combustion engine, a difference between an actual engine speed and the target engine speed is naturally quite large. Advancing correction of the ignition timing is effected depending upon the difference, a correction value becomes quite large. Large advancing correction of the ignition timing should cause abnormal injection or pre-ignition to potentially damage the engine. Therefore, it becomes necessary to disable correction of the ignition timing until the engine speed is increased close to a target idling speed.

Even when correction of the ignition timing is performed after the engine speed reaches a speed close to the target idling speed, the following problem is still encountered. Namely, in the recent automotive brake system, a mechanism, called as a brake booster (also called as master vac) for boosting depression force exerted on a brake pedal by a driver by accumulating vacuum pressure of the air induction passage generated in the internal combustion engine. Particularly, in case of an automotive vehicle with an automatic power transmission, in which engine brake during deceleration is not so effective, a braking force is significantly relies on the performance of the brake device.

Accordingly, it becomes quite important task for safety to quickly store vacuum in the brake booster.

Therefore, in control of the internal combustion engine, after starting-up the engine, a control characteristics is provided to once accelerate the engine speed beyond the target engine speed. This can also be realized by setting the target engine speed per se at high speed. However, when the high idling speed is maintained for a long period, strange feeling may be given for the driver. It is also possible to cause unwanted starting-up or acceleration of the vehicle. Therefore, such method is not desirable.

Therefore, it becomes necessary to certainly provide a period for maintaining the actual engine speed higher than the target engine speed. Despite of this fact, if advancing control for the ignition timing is performed, the actual engine speed is quickly converged to the target engine speed without being accelerated beyond the target engine speed. In such case, sufficient vacuum cannot be stored and accumulated in the brake booster to degrade brake performance.

Therefore, it becomes necessary to provide means for certainly maintain the period to hold the actual engine speed higher than the target engine speed by providing a delay time for initiating operation of the ignition timing correction. On the other hand, when the delay period is excessively long, the similar problem that can be caused when the target engine speed is set higher, is possibly caused. Therefore, means for optimally setting the delay period also becomes necessary.

Conversely, when an engine start-up characteristics is degraded due to use of heavy gasoline or other cause and thus the engine speed cannot be accelerated quickly, it should be advantageous to initiate operation of the ignition timing correction at earlier timing for effecting advancing correction of the ignition timing at earlier so that the actual engine speed may reach the target engine speed at earlier timing. In order to make such advantage effective, it becomes necessary to provide means for monitoring acceleration of the engine speed upon starting-up and initiate operation of the ignition timing correction at earlier timing when judgment is made that acceleration of the engine speed is low.

In such case, it becomes necessary to further provide means for preferentially initiate operation of the ignition timing correction without waiting the delay period when low acceleration of the engine speed in engine start-up transition is judged during process of delay period.

The ignition timing correction is generally performed for converging the engine speed to the target engine speed. Therefore, when the actual engine speed is lowered than the target engine speed, the ignition timing is basically corrected to advance to increase an engine torque to be developed to accelerate the actual engine speed toward the target engine speed. However, this can be effective only in the case where the actual engine speed is relatively close to the target engine speed. When the actual engine speed drops significantly from the target engine speed, different measure becomes necessary.

The internal combustion engine has a property that when the ignition timing is set at slightly retarded angle, combustion becomes stable to be persistent to difficult to cause engine stall at low engine speed range. Utilizing such property, in order to present the engine from stalling even when the engine speed is abruptly dropped by operation of clutch upon starting-up of a vehicle with manual transmission, a measure is taken to set basic ignition timing at slightly retarded angle in such vehicle driving condition for providing smooth vehicle driving characteristics. If the foregoing ignition timing correction becomes effective in such vehicle driving condition to advance the ignition timing, the retarded ignition timing for smooth vehicle driving characteristics should be advanced to make it impossible to obtain the intended vehicle driving characteristics.

Therefore, it becomes necessary to provide means for disabling advancing correction, more desirably for retarding the ignition timing in the engine speed range much lower than the target engine speed. For example, Japanese Unexamined Patent Publication No. JP-A-63-198748 proposes a method to provide asymmetric correction characteristics. Japanese Unexamined Patent Publication No. JP-A-63-302177 proposes a method to provide non-linear correction characteristics. Also, Japanese Unexamined Patent Publication No. JP-A-5-1656 proposes a method to provide greater correction value at greater difference between the target engine speed and the actual engine speed. However, these prior proposals do not consider retarding correction of the ignition timing.

As set forth above, when an engine start-up characteristics is degraded due to use of heavy gasoline or other cause and thus the engine speed cannot be accelerated quickly, it is advantageous to initiate operation of the ignition timing correction at earlier timing for effecting advancing correction of the ignition timing at earlier so that the actual engine speed may reach the target engine speed at earlier timing. In such case, if the retarding correction of the ignition timing in the range where the actual engine speed is much lower than the target engine speed, is effected immediately after starting-up of the engine, adverse effect should be given for early convergence of the actual engine speed to the target engine speed under low engine start-up characteristics due to heavy gasoline or other cause. Therefore, in order to attain quick convergence of the engine speed to the target engine speed, it becomes necessary to provide means for restricting retarding correction of the ignition timing for a certain period from starting-up of the engine.

The period to restricting retarding correction may be differentiated depending upon a magnitude of friction of the engine since acceleration characteristics of the engine speed upon starting-up is variable depending thereon. Therefore, a process taking the magnitude of the friction into account becomes necessary.

As set forth above, the ignition timing correction is to correct the basic ignition timing depending upon difference between the actual engine speed and the target engine speed while a throttle valve is fully closed, that is in idle state. When the ignition timing correction is switched between active and inactive at transition of the throttle valve angular position between the fully closed position and not fully closed position, the ignition timing can be varied abruptly.

For example, upon deceleration from high engine speed range, the actual engine speed at a timing where the throttle valve is fully closed, is much higher than the target engine speed, quite large retarding correction value is abruptly applied to cause degradation of drivability and increasing of undesired exhaust emission components. Conversely, when the throttle valve is driven to open in the engine idling condition where the actual engine speed is higher than the target engine speed and the ignition timing is corrected for retarding, retarding correction is instantly terminated and retarding of the ignition timing is suddenly released to cause advancing of the ignition timing to cause degradation of drivability. Therefore, as a solution for either cases, it becomes necessary to provide means for restricting variation speed of the correction amount.

Even when the period to maintain the actual engine speed higher than the target engine speed after starting up of the internal combustion engine, can be set optimally, if the ignition timing correction amount cannot reach a target correction amount due to restriction of variation speed of the correction amount, the similar problem that can be caused when the target engine speed is set higher, is possibly caused. Therefore, it becomes necessary to provide means for inhibiting restriction of the variation speed of the ignition timing correction amount for a certain period after starting-up of the internal combustion engine.

On the other hand, during deceleration, drivability is degraded and exhaust emission is increased unless the variation speed of the correction amount is restricted, as set forth above. This is the problem during deceleration transition until a fuel cut-off mode becomes active. Once fuel-cut mode becomes active and subsequently acceleration is demanded, if the variation speed of the correction amount is restricted to vary the ignition timing gradually, the ignition timing should be differentiated upon occurrence of the acceleration demand, depending upon a period, in which the fuel cut mode is maintained. Thus, behavior of drivability becomes different at every occasion to give unnatural feeling to degrade product quality of the vehicle. Accordingly, it becomes necessary to provide means for inhibiting restriction of the variation speed of the correction amount when fuel cut mode is active during deceleration state to prevent variation of the ignition timing at every occurrence of acceleration demand.

On the other hand, if restriction of variation speed of the correction amount is effective while the actual engine speed of the internal combustion engine is close to the target engine speed, response characteristics in engine speed control can be degraded to interfere quick convergence of the actual engine speed to the target engine speed as originally intended. Therefore, it becomes necessary to provide means for inhibiting restriction of variation speed of the correction amount when the actual engine speed is close to the target engine speed.

When the actual engine speed is quite quickly decelerated from the speed high than the target engine speed, dropping of the engine speed should be induced when normal retarding correction of the ignition timing is effected. In order to solve such problem, Japanese Unexamined Patent Publication No. JP-A-3-47472 proposes a method for controlling correction with providing a delay for a given period after detection of an engine idling state. As set forth above, in practice, the engine speed in the engine idling state is controlled so as not to cause abrupt drop of the engine speed by controlling not only the ignition speed but also the throttle bypass valve. Therefore, the engine speed is not always decelerated to cause abrupt drop thereof.

Therefore, if application of retarding correction is simply delayed by the delay period, it cannot be possible flexibly respond to the lowering speed of the engine speed of the internal combustion engine. Therefore, it becomes necessary to provide means for restricting actuation of correction depending upon the lowering speed of the actual engine speed.

Consideration is given that when the actual engine speed is gradually lowered but is still higher than the target engine speed and the ignition timing is corrected for retarding in order to lower the engine speed. When re-acceleration is caused from this condition, retarding correction is applied, sufficient torque cannot be developed to cause degradation of drivability. Therefore, at the transition from deceleration to acceleration, it becomes necessary to provide means for restricting retarding correction by detecting the accelerating condition of the internal combustion engine.

Means for restricting retarding correction is introduced for the purpose to eliminate a problem caused by restriction of the variation speed of the correction amount or to eliminate a problem of the correction per se, and has to be at least actuated preferentially that the restricting means of the variation speed.

When the intake air flow rate for the internal combustion engine becomes uncontrollable at the condition where the air flow rate is excessive due to sticking or damaging of the throttle valve or the throttle bypass valve, the ignition timing correction maintains retarding correction of the ignition timing for converging the actual engine speed to the target engine speed. This causes elevation of the exhaust temperature to accelerate fatigue of parts of an exhaust system or to cause damaging of the parts.

Japanese Patent Application Laid-open No. JP-A-62-170776 discloses an ignition timing control apparatus for controlling the engine speed.

SUMMARY OF THE INVENTION

In order to solve the foregoing problems, an ignition control system for an internal combustion engine, according to one embodiment of the present invention, comprises a basic ignition timing setting unit for setting a basic ignition timing, an engine driving condition detecting unit detecting at least an engine speed, a target engine speed setting unit for setting a target value of the engine speed while the engine is in idling condition, an ignition timing correcting unit for correcting the basic ignition timing depending upon a difference of the target engine speed and the actual engine speed, an ignition timing control unit for controlling the ignition timing of the internal combustion engine on the basis of the ignition timing after correction. The ignition timing correction is initiated after the engine speed is once increased to be higher than or equal to a predetermined value so that the engine speed of the internal combustion engine can be quickly controlled to the target engine speed with avoiding abnormal advance immediately starting-up of the engine.

On the other hand, the ignition timing correction is initiated with taking the elapsed time after the engine speed once reaches the predetermined value, an accumulation amount of an intake vacuum, engine speed take-up characteristics upon starting-up as parameters.

Also, the ignition timing correction is provided a characteristics to advancing and retarding the ignition timing depending upon degree of deviation of the actual engine speed to the target engine speed while the instant engine speed is lower than the target engine speed, includes a period for restricting retarding correction or inhibiting the retarding correction at certain elapsed period after starting-up. Also, the period for restricting the correction mount is determine with taking a friction of the internal combustion engine as a parameter.

The system further comprises a correction amount variation speed restricting unit for restricting the variation amount of the correction value to a predetermined maximum variation amount when the variation amount of the correction amount of the ignition timing correction is greater than a predetermined maximum variation amount. The correction amount variation speed restricting unit operates with taking detection of fully closed position of the throttle valve, detection of elapsed period after starting of the engine or detection of deceleration of the internal combustion engine as parameter.

Also, the system further comprises a engine speed lowering responsive correction restricting unit for restricting ignition timing correction or inhibiting correction when lowering of the engine speed of the internal combustion engine is detected and the engine speed is higher than a predetermined value.

It should be noted that, in the foregoing and following description, "throttle valve fully closed position" means represents the position of the throttle valve in engine idling condition, in which a little throttle valve open angle in the extent to permit the intake air flow through an air horn for idling is provided.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 14 is a flowchart showing a procedure of operation of a fail-safe means.

DESCRIPTION OF THE PREFERRED EMBODIMENT

One embodiment of the present invention will be discussed hereinafter in detail with reference to the accompanying drawings.

Figure 1:
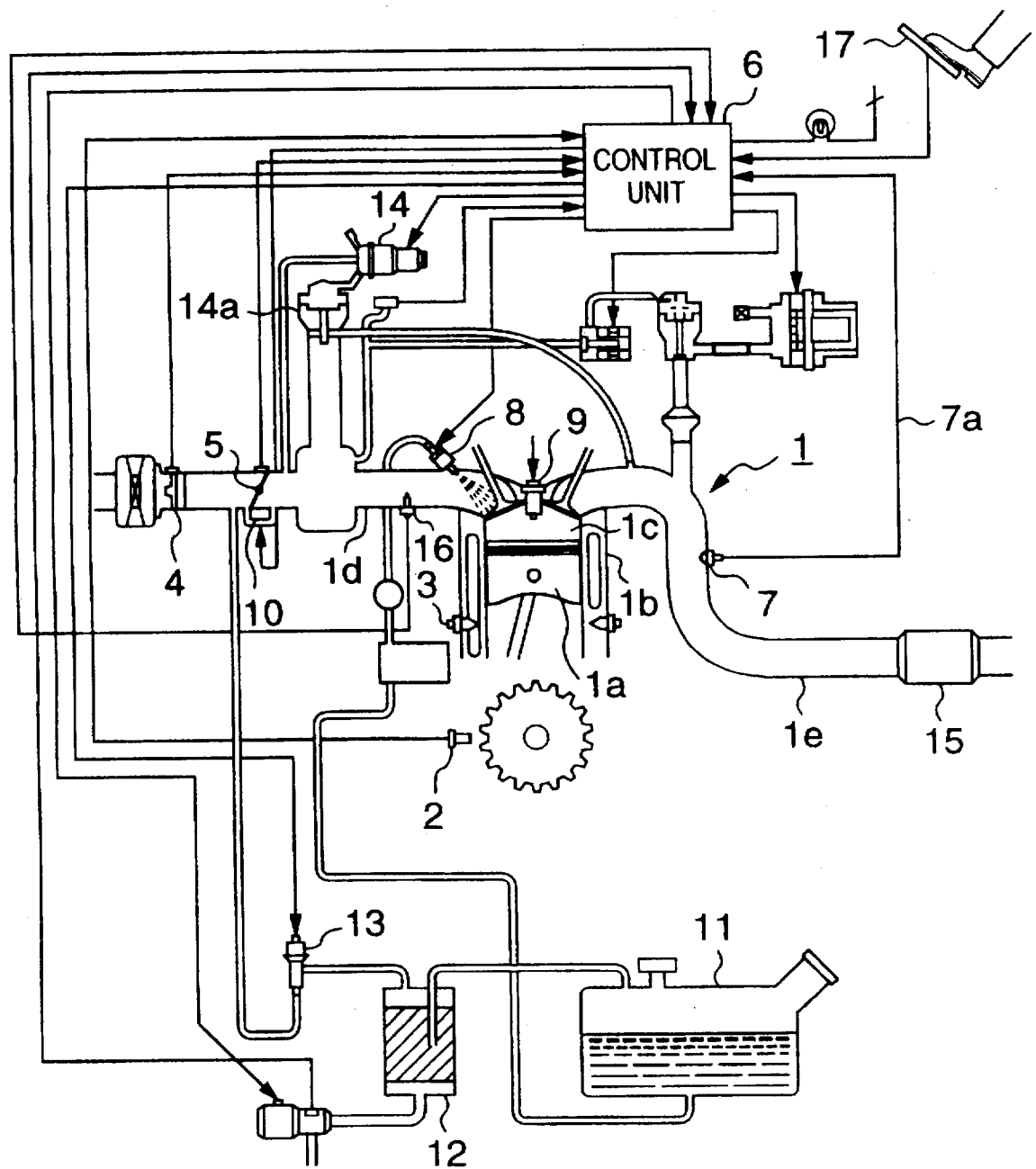
FIG. 1 is a diagrammatic illustration showing one embodiment of an ignition timing control system according to the present invention.

FIG. 1 shows the overall construction of one embodiment of an internal combustion engine and an ignition timing control system for the internal combustion engine, according to the present invention. Here, the reference numeral 1 denotes an internal combustion engine, 1d denotes an air induction pipe, 1e denotes an exhaust pipe, 2 denotes an engine speed sensor, 3 denotes a coolant temperature sensor, 4 denotes an intake air flow meter, 5 denotes a throttle angle sensor, 6 denotes a control unit, 7 denotes an air/fuel ratio sensor, 8 denotes a fuel injector, 9 denotes a spark ignition plug, 10 denotes an idle adjust air control valve and 11 denotes a fuel tank.

In each cylinder of the internal combustion engine 1, a combustion chamber 1c is defined between a piston 1a and a cylinder head 1b. In the air induction pipe 1a, the fuel injector 8 for injecting fuel supplied from a fuel supply system including the fuel tank 11 or so forth, an idle adjust air control valve 10 and so forth are arranged. The spark ignition plug 9 is disposed within the combustion chamber 1c. Also, a catalytic converter 15 is disposed within the exhaust pipe 1e. The reference numeral 12 denotes an evaporative fuel canister, 13 denotes a purge valve, 14a denotes an EGR (exhaust gas recirculation) valve, and 14 denotes an EGR control valve for controlling an open degree of the EGR valve.

In the internal combustion engine, the engine speed sensor 2, the coolant temperature sensor 3, the intake air flow meter 3, the throttle angle sensor 5 and an intake vacuum sensor 16 are arranged for detecting driving condition of the internal combustion engine 1. A sensor (not shown) for detecting depression magnitude of a pedal is associated with an accelerator pedal 17. A signal corresponding to depression magnitude of the accelerator pedal is input the control unit 6.

The control unit 6 receives detection signals from various detection sensors set forth above, on the basis of the results of detection, and controls the fuel injector 8 for fuel injection, an ignition coil (not shown), the spark ignition plug 9, the idle adjust air control valve 10 and so forth.

The control unit 6 is constructed with later-mentioned a basic ignition timing setting unit, a throttle valve fully closed position detecting unit, a target engine speed setting unit, an ignition timing correcting unit, an ignition timing control unit, a first parameter obtaining unit, a start-up engine speed monitoring unit, a second parameter obtaining unit, a correction amount variation speed restricting unit, a deceleration detecting unit, an engine speed lowering speed detecting unit, an engine speed lowering responsive correction restricting unit, a throttle valve opening speed detecting unit, a load increasing speed detecting unit, an engine speed increasing speed detecting unit, an acceleration judgment unit, an acceleration responsive correction restricting unit, an air/fuel ratio adjusting unit, a fail-safe unit and so forth.

Figure 2:
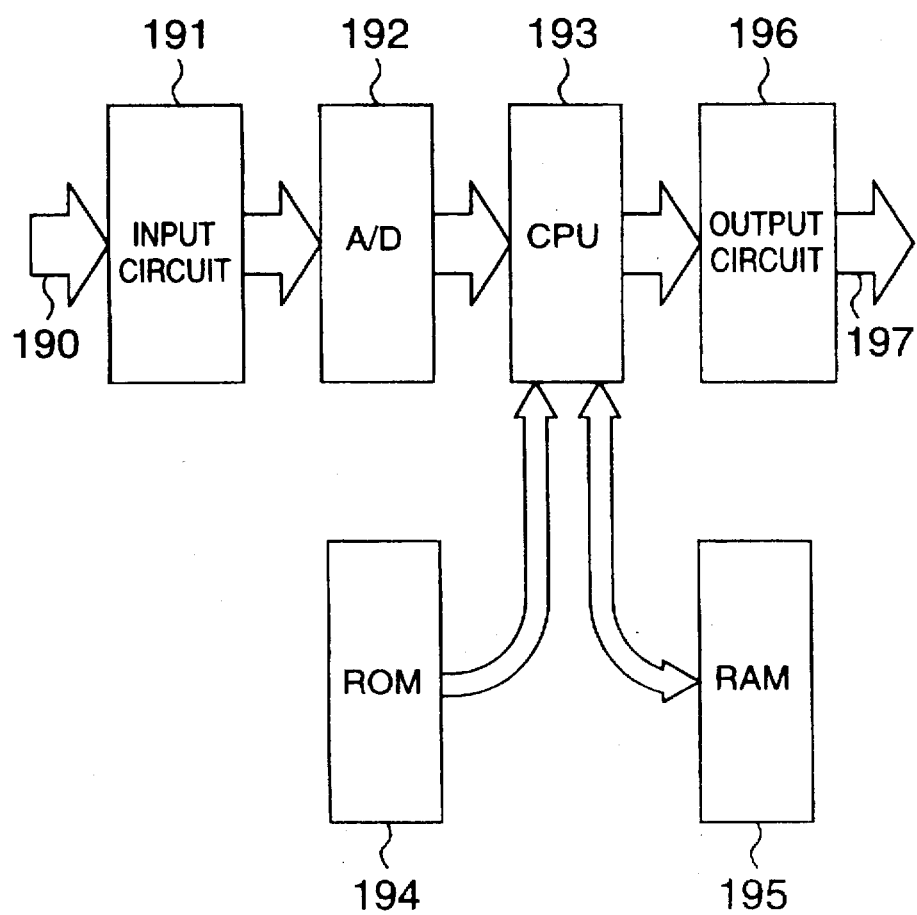
FIG. 2 is a block diagram showing an internal construction of a control unit 6.

As shown in FIG. 2, the control unit 6 is constructed with an input circuit 191, an A/D converter portion 192, a central arithmetic unit 193, a ROM 194, a RAM 195 and an output circuit 196.

The input circuit 191 receives input signals 190 (e.g. signals from the coolant temperature sensor 3, the intake air flow meter 4, the throttle angle sensor 5, the air/fuel ratio sensor 7 or so forth). Then, the input circuit 191 removes noise component from the received signals and output to the A/D converter portion 192. The A/D converter portion 192 effects analog-to-digital conversion for the input signals to output to the central arithmetic unit 193. The central arithmetic unit 193 receives the A/D converted signals and execute predetermined program stored in the ROM 194 to perform respective controls and diagnosis.

The results of arithmetic operation and results of A/D conversion are temporarily stored in the RAM 195. The results of arithmetic operation is output as control output signal 197 via an output circuit 196 and is used for controlling the fuel injector 8 and so forth. However, the construction of the control unit 6 is not limited to the shown construction.

Figure 3:
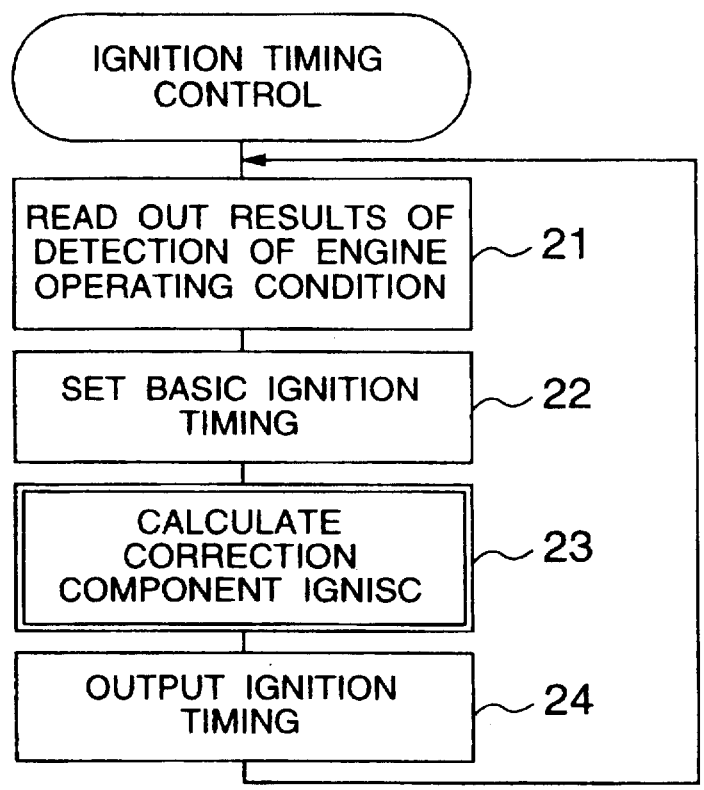
FIG. 3 is a flowchart showing an overall procedure of an ignition timing control.

FIG. 3 shows an overall procedure of ignition timing control. Shown procedure group is triggered at every predetermined timing or at every predetermined crank angle of the engine. The shown procedure group is repeatedly executed.

Figure 4:
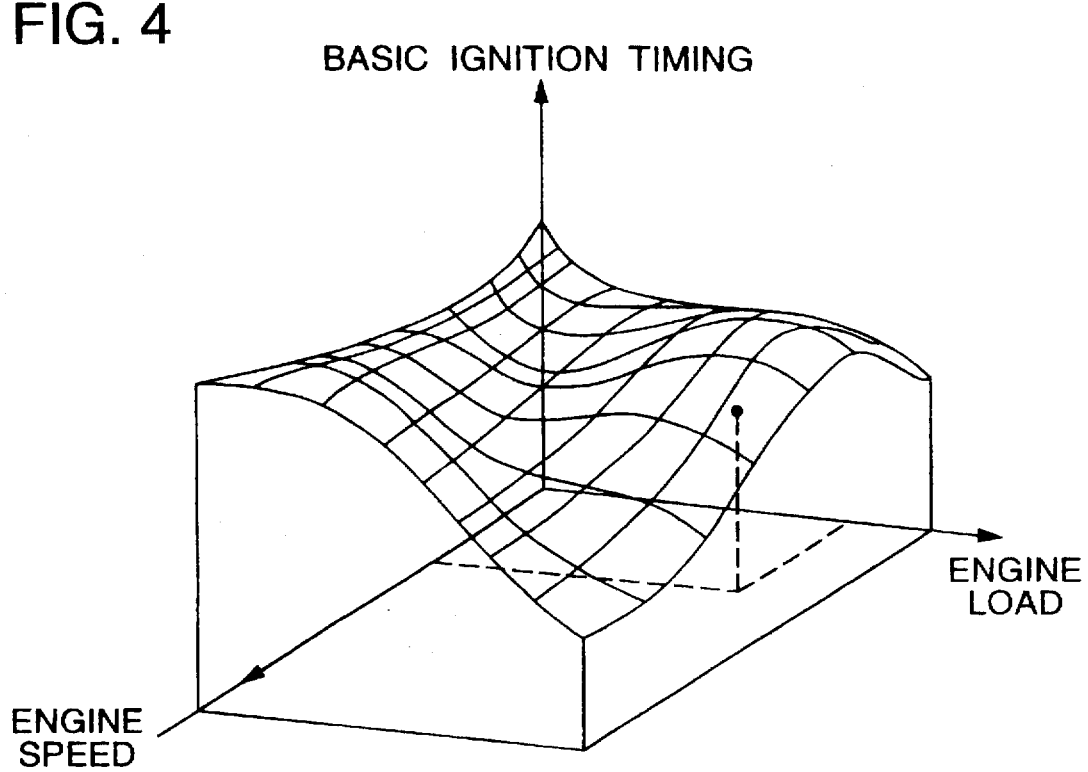
FIG. 4 is a chart showing a basic ignition timing characteristics.

At step 21, engine operation indicative parameters including the engine speed, engine load and so forth detected by sensors detecting operating condition of the internal combustion engine, are received. Then, at step 22, a basic ignition timing is set depending upon the engine speed and the engine load by the basic ignition timing setting unit. A ignition timing control characteristics is illustrated in a form of three-dimensional data map shown in FIG. 4. Then, at step 23, a correction component IGNISC is determined by the ignition timing correcting unit. Particular manner of implementation of such control will be discussed with reference to FIG. 5 and subsequent drawings. At a final step 24, by adding the correction component IGNISC to the basic ignition timing in the ignition timing control unit for correcting the ignition timing so that the ignition timing is controlled by supplying the corrected ignition timing to the internal combustion engine.

Figure 5A:
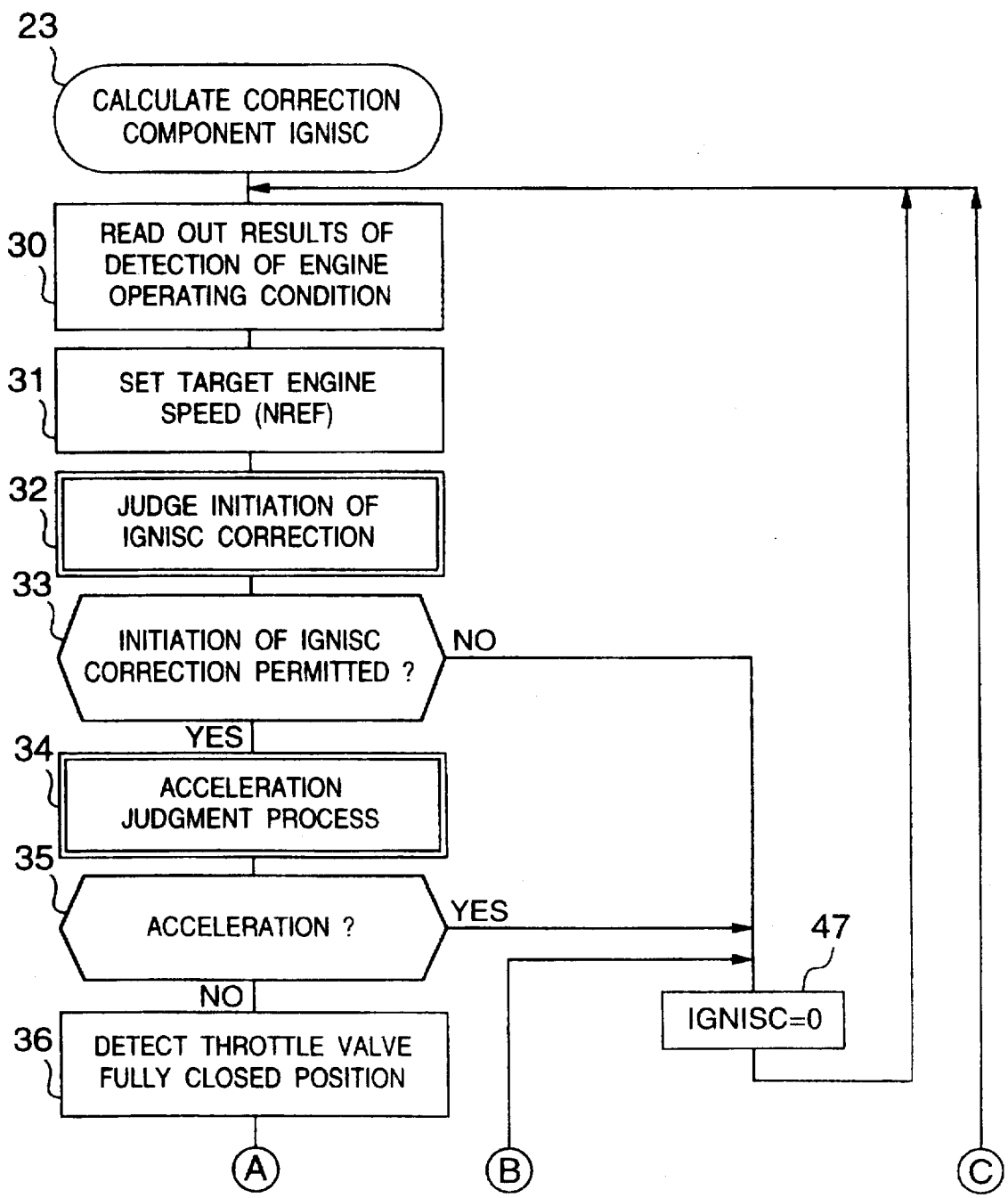
FIGS. 5A and 5B show a flowchart showing the overall procedure of an ignition timing correction.
Figure 5B:
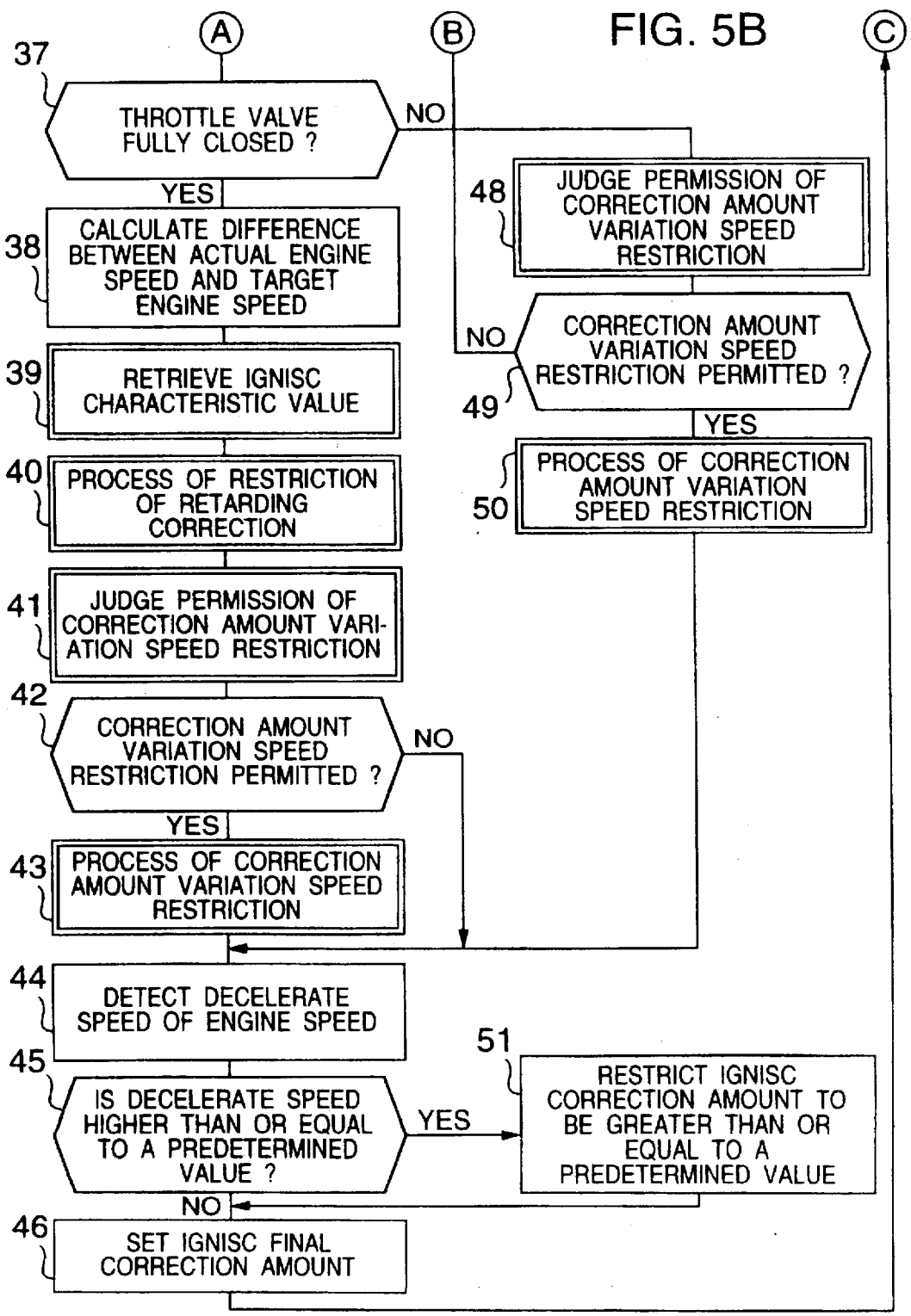

Next, on the basis of FIG. 5, discussion will be given for operation of the ignition timing correcting portion, namely an IGNISC correction component calculating unit. The shown procedure is executed repeatedly.

At first, at step 30, similarly to step 21 of FIG. 3, the engine speed, the engine load, the engine coolant temperature, the throttle valve open angle, an intake air flow rate to the internal combustion engine, the intake vacuum of the internal combustion engine and other engine operation associated parameters detected by the engine driving condition detecting sensors are received.

Next, at step 31, the target engine speed in the fully closed condition of the throttle valve is set by the target engine speed setting unit. The target engine speed thus determined can be a fixed value or, in the alternative, can be set as a function of the result of detection of the engine driving condition, such as the engine coolant temperature.

At step 32, judgment is performed whether correction of the ignition timing by the correction component IGNISC is to be initiated or not. Particular process will be discussed layer with reference to FIG. 6. If judgment is made that ignition timing correction by the correction coefficient IGNISC should not be initiated, the process is branched at step 33 and advanced to step 47. Then, the correction component IGNISC is set to zero to terminate the process. Then, process is placed in stand-by state to wait for next trigger timing.

On the other hand, if judgment is made to initiate ignition timing correction with the correction component IGNISC, the process is branched and advanced to step 34 to make judgment whether the vehicle is in accelerating state or not by the acceleration judgment unit. The particular process will be discussed in detail with reference to FIG. 7.

If judgment is made that the vehicle is in acceleration state at step 34, the process is branched at step 35 to step 47 by the acceleration responsive correction restricting unit. Then, the correction component IGNISC is set to zero to terminate the process. Then, process is placed in stand-by state to wait for next trigger timing. It should be noted that the acceleration responsive correction restricting means makes judgment in advance of any other processes and thus is processed preferentially in advance of actuation of the correction value variation speed restricting unit which will be discussed later.

On the other hand, if judgment is made at step 34 that the vehicle is not in acceleration state, the process is branched to step 36 at step 35 to make judgment whether the throttle valve is in fully closed position or not. This can be judged by checking whether the throttle valve open angle received at step 30 is a value corresponding to fully closed position of the throttle valve. In the alternative, judgment whether the throttle valve is in fully closed position or not, can be done by checking whether the intake air flow rate to the internal combustion engine is a value corresponding to the fully closed position of the throttle valve or whether the intake vacuum is a value corresponding to the fully closed position of the throttle valve.

Figure 8:
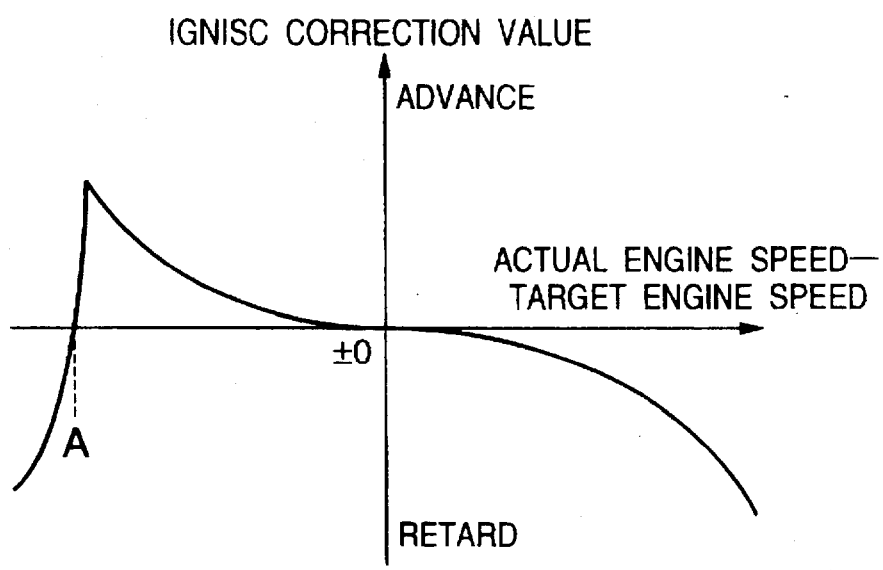
FIG. 8 is a chart showing a characteristics of an ignition timing correction amount.

If judgment is made that the throttle valve is in fully closed position at step 37 in view of the results of detection, process is advanced to step 38 to derive a difference between an actual engine speed and the target engine speed. Depending upon the difference, the correction component IGNISC is determined by looking-up a characteristic value table at step 39. One example of the characteristic value table is shown in FIG. 8. Correction characteristics of FIG. 8 is set to increase a retarding correction amount at greater excess amount of the actual engine speed beyond the target engine speed. On the other hand, an advancing correction amount is set greater at lower actual engine speed below the target engine speed. However, when the actual engine speed drops significantly across a point A, the correction is effected for retarding.

Next, at step 40, process is performed for restricting the retarding correction for a predetermined period. The particular process will be discussed with reference to FIG. 9.

When the correction component IGNISC to be set through the foregoing procedure is determined, judgment is made whether actuation of the correction value variation speed restricting unit, which will be discussed later, at the fully closed position of the throttle valve is permitted or not at next step 41. Particular process will be discussed later with reference to FIG. 10.

If decision is made that actuation of the correction value variation speed restricting unit is not permitted, a process is advanced to step 44 with the correction component IGNISC determined up to step 40.

Figure 11:
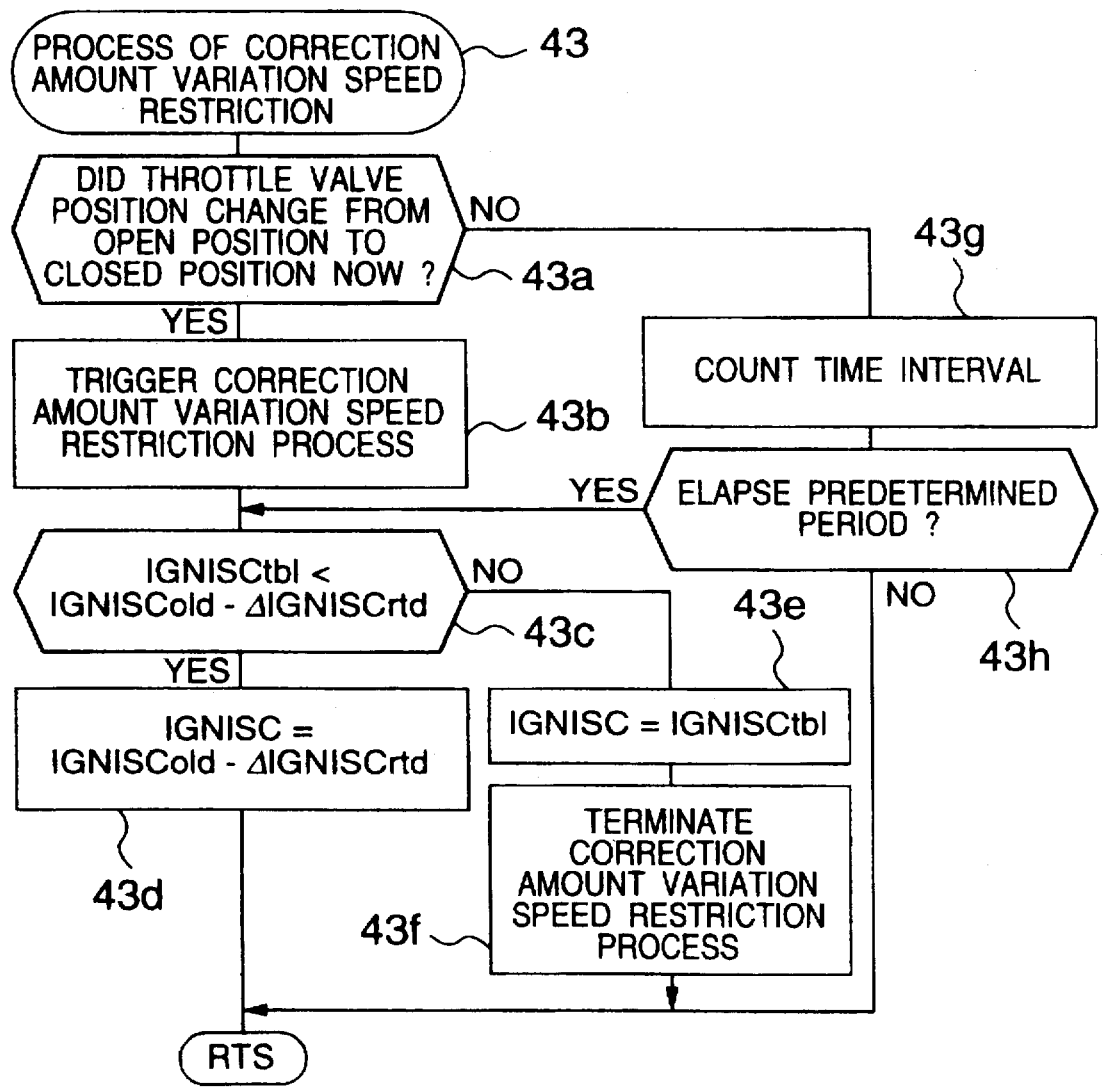
FIG. 11 is a flowchart showing a procedure of restriction of variation speed of correction amount under throttle valve fully closed position.

When decision is made that actuation of the correction value variation speed restricting unit is permitted, at step 41, the process is branched at step 42 to restrict variation speed of the correction component IGNISC by the correction value variation amount restricting unit at step 43. After restriction of the variation speed of the correction component IGNISC, the process is advanced to step 44 with the correction component IGNISC. Particular process of the correction value variation speed restricting unit of step 43 will be discussed later with reference to FIG. 11.

At step 37, if judgment is made that the throttle valve is not in fully closed position, the process is advanced to step 48 to make judgment whether actuation of the correction value variation speed restricting unit under the condition where the throttle valve is not fully closed, is to be permitted or not. Particular process will be discussed with reference to FIG. 12.

If decision is made that actuation of the correction value variation speed restricting unit is not permitted at step 48, the process is advanced to step 47. Then, the correction component IGNISC is set to zero to terminate the process. Then, process is placed in stand-by state to wait for next trigger timing.

On the other hand, if decision is made that actuation of the correction value variation speed restricting unit is permitted at step 48, the process is branched at step 49 to restrict variation speed of the correction component IGNISC by the correction value variation speed restricting unit at step 50. After restriction of the variation speed, the process is advanced to step 44 with the correction component IGNISC. Particular process of the correction value variation speed restricting unit of step 50 will be discussed later with reference to FIG. 13.

For the correction component IGNISC determined through the process set forth above, following restriction has to be provided. At first, at step 44, by the engine speed lowering speed detecting unit, deceleration of lowering engine speed is detected. When variation speed, i.e. deceleration, is higher than or equal to a predetermined value as judged at step 45, the correction component IGNISC is restricted to be greater than or equal to the correction component IGNISC by the engine speed lowering responsive correction restricting unit, at step 51. Then, process is advanced to step 46, a final value of the correction component IGNISC is determined to terminate the series of process. Then, process is placed at stand-by state. It should be noted that the engine speed lowering responsive correction restricting unit performs process after any of the processes, it is actuated preferentially before actuation of the correction value variation speed restricting unit.

On the other hand, when judgment is made that the variation speed is not higher than the predetermined value, the correction component IGNISC determined at step before step 44 is taken as the final value, and the series of process is terminated. Then, process is placed in stand-by state until the next trigger timing.

Figure 6:
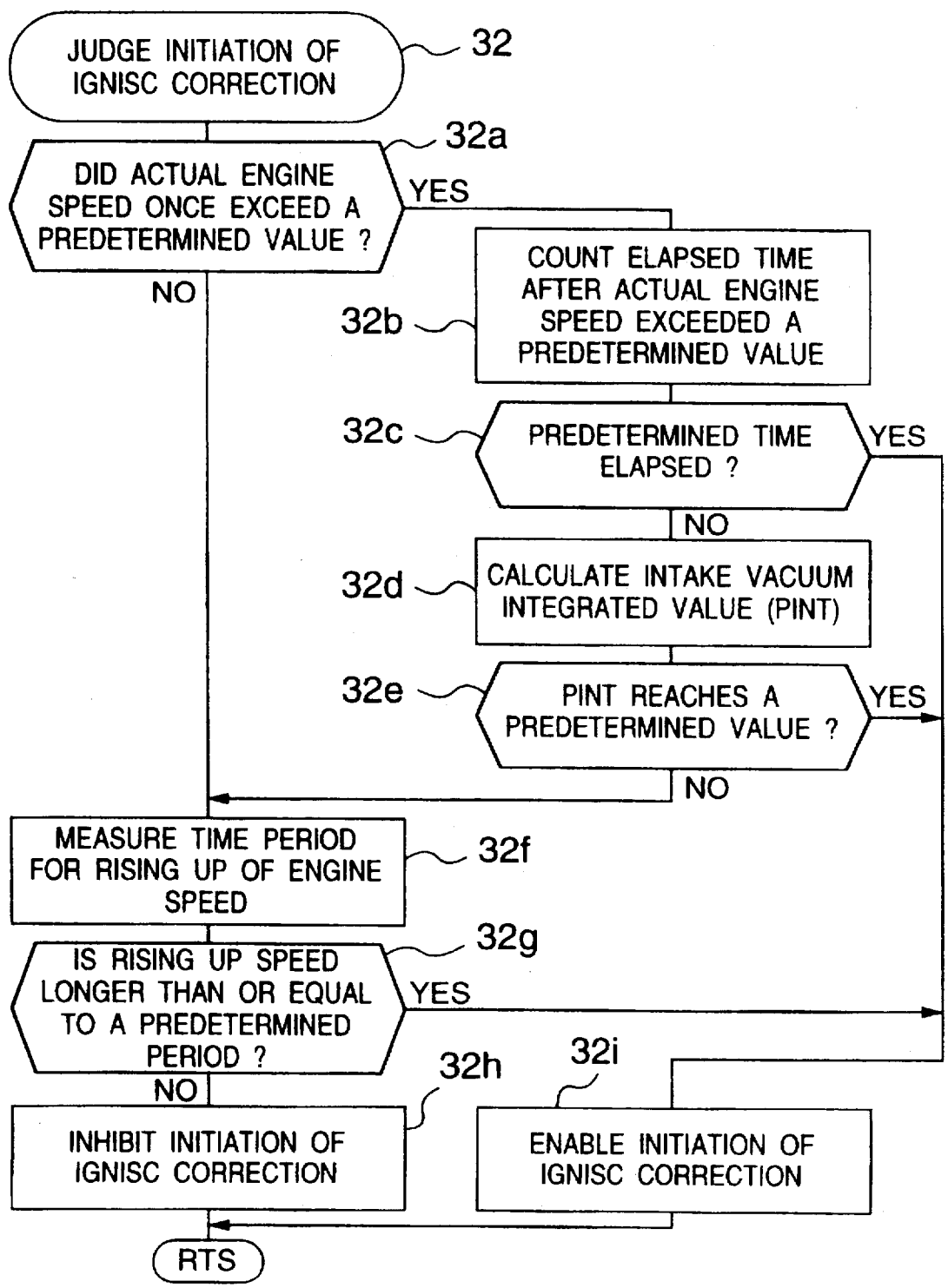
FIG. 6 is a flowchart showing the procedure of judgment of initiation of the ignition timing correction.

With reference to FIG. 6, a procedure for making judgment of initiation of ignition timing correction at step 30 will be discussed, at step 32a. At first, judgment is made whether the actual engine speed of the internal combustion engine taken at step 30 is already reached at a predetermined value. If the actual engine speed does not yet reach the predetermined value, the process is advanced at step 32f, acceleration of the engine speed upon starting-up of the engine is checked by start-up engine speed monitoring unit. In concrete, checking of acceleration of the engine speed upon starting-up of the engine can be realized by measuring a period required for accelerate the engine speed up to a given engine speed. However, the manner is not specified to this.

As a result of monitoring of the engine speed upon starting up obtained at step 32f, if judgement is made that taking up speed of the engine speed is low as the period required for accelerating the engine speed to the given engine speed is longer than or equal to a predetermined period at step 32g, the process is advanced to step 32i to permit correction of the ignition timing with the correction component IGNISC, and then terminate the sequence of process for making judgment of initiation of the ignition timing correction. On the other hand, if judgment is made that the take up speed is high, the process is advanced to step 32h to inhibit correction of the ignition timing with the correction component IGNISC.

When judgment is made that the actual engine speed has already reached the predetermined value, the process is advanced at step 32b to take an elapsed period after the timing, at which the actual engine speed is accelerated across the predetermined engine speed. When judgment is made that the elapsed period is longer than or equal to a predetermined period at step 32c, the process is advanced to step 32i.

On the other hand, if judgment is made that the elapsed period is not yet reached the predetermined period at step 32c, the process is advanced to step 32d to derive a time integrated value of the intake vacuum of the internal combustion engine taken at step 30, as a parameter representative of accumulation amount of the intake vacuum of the internal combustion engine by the first parameter obtaining unit. Assuming that an induction pipe pressure is Pm and an atmospheric pressure is Patm, the integrated value of the intake vacuum is derived by calculation of ∫(Patm−Pm).

It should be appreciated that the parameter value representative of the accumulated value of the intake vacuum of the internal combustion engine can be derived from a period where a relationship between the open angle of the throttle valve and the engine speed of the internal combustion engine is maintained in predetermined condition, as replacement of the process to obtain the parameter value by the time integrated value of the intake vacuum. However, manner to obtain the parameter value is not specified to these manners.

Figure 7:
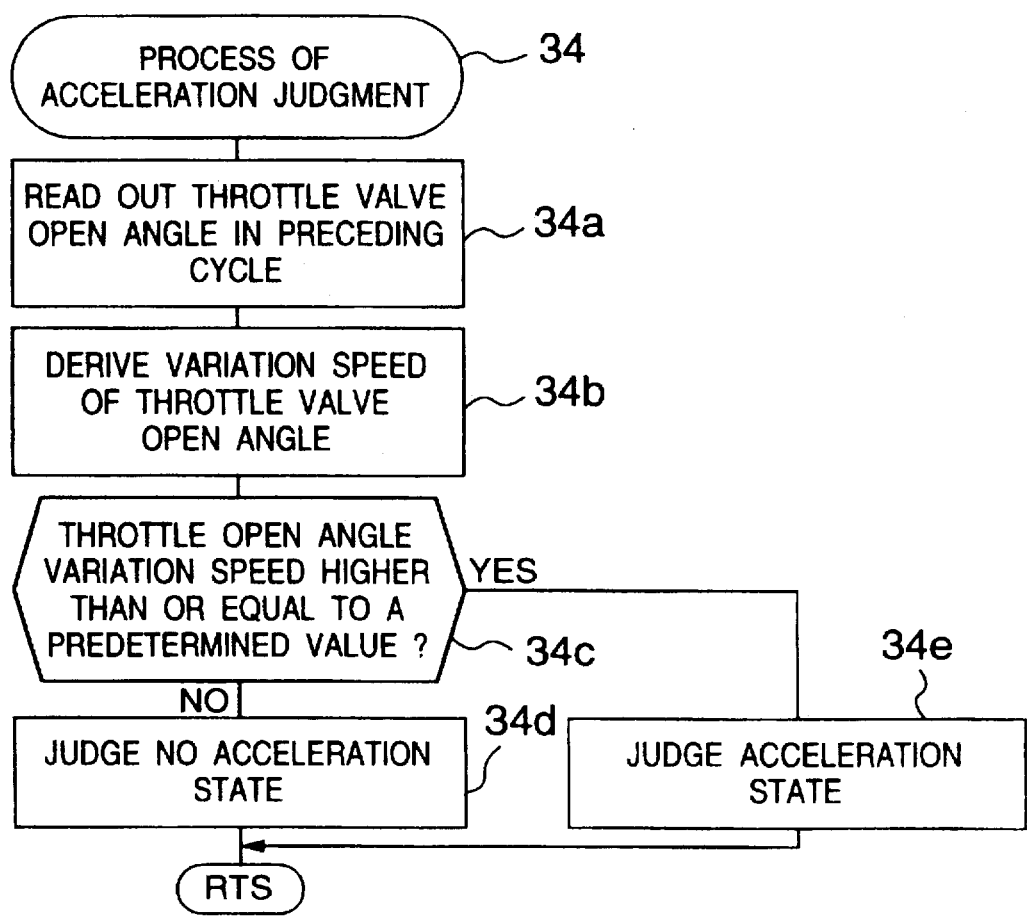
FIG. 7 is a flowchart showing the procedure of judgement for acceleration.

A process of the acceleration judging unit at step 34 in the flowchart of FIG. 5 will be discussed with reference to FIG. 7. At first, at step 34a, the throttle valve open angle taken in the preceding process cycle is read out. At next step 34b, a difference between the throttle valve open angle read out at step 34a and the throttle valve open angle taken at step 30 by the throttle valve opening speed detecting unit, is calculated and thus a variation speed of the throttle valve open angle per unit period is derived. On the basis of the result of calculation, at step 34c, judgment is made whether the variation speed of the throttle valve open angle is higher than or equal to a predetermined value or not.

If the variation speed of the throttle valve open angle is higher than or equal to the predetermined value, acceleration state is judged. Then, a sequence of process of the acceleration judgment unit at step 34 is completed. On the other hand, if judgment is made that the variation speed of the throttle valve open angle is not higher than or equal to the predetermined value, the process is advanced to step 34d, judgment is made that the engine is not in the acceleration state. Then, a sequence of process is terminated. While judgement whether the engine is in accelerating state or not is made on the basis of the result of detection by the throttle valve opening speed detecting unit, it is also possible to make judgment whether the engine is in accelerating state or not by result of detection by the load increasing speed detecting unit or an engine speed acceleration detecting unit or combination thereof. Of course, manner of detecting parameter for making judgement whether the engine is in accelerating state or not, is not specified to those discussed above.

Figure 9:
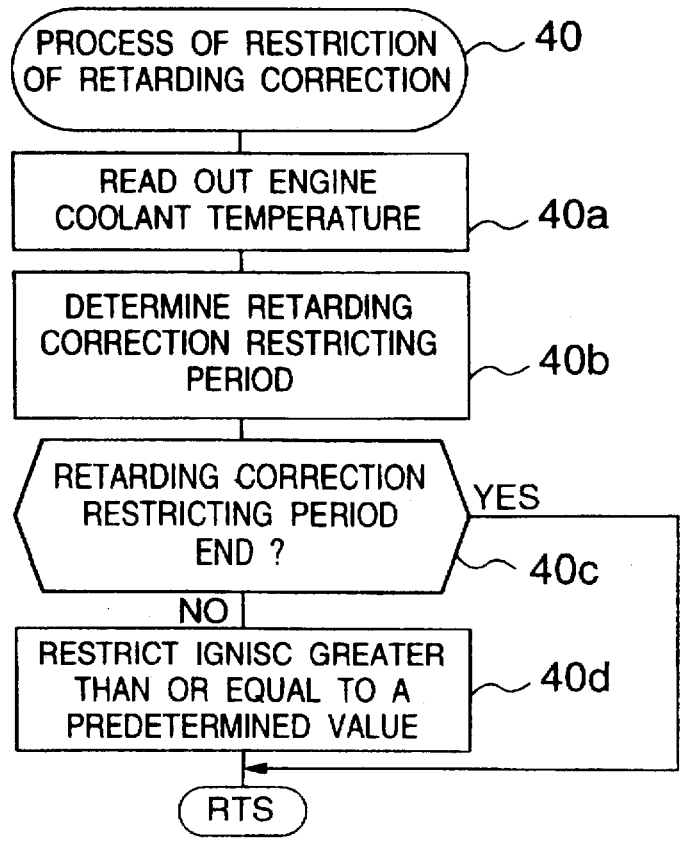
FIG. 9 is a flowchart showing a procedure of a retarding correction restricting process of the ignition timing correction.

The process for restricting the retarding correction in step 40 in the flowchart of FIG. 5 will be discussed with reference to FIG. 9. At first, at step 40a, the engine coolant temperature of the internal combustion engine as a parameter representative of a friction of the internal combustion engine is taken by the second parameter obtaining unit. In addition to the engine coolant temperature of the internal combustion engine, a lubricant temperature of the internal combustion engine or lubricant temperature of the power transmission connected to the internal combustion engine can be taken as the parameter representative of friction of the internal combustion engine. Of course, manner of detecting parameter representative of friction of the internal combustion engine is not specified to those discussed above.

As a function of the engine coolant temperature taken at step 40a, the period to restrict retarding correction of the correction component IGNISC after starting-up of the internal combustion engine is determined at step 40b. At step 40c, judgment is made whether the period thus determined has elapsed or not. If not elapsed, the process is adapted to step 40d to restrict the correction component IGNISC at a value greater than or equal to a predetermined value. Then, a sequence of processes for restricting the retarding correction at step 40 goes end. On the other hand, if judgment is made that the predetermined period has elapsed at step 40c, the sequence of process directly goes end without providing any restriction for the correction component IGNISC.

Figure 10:
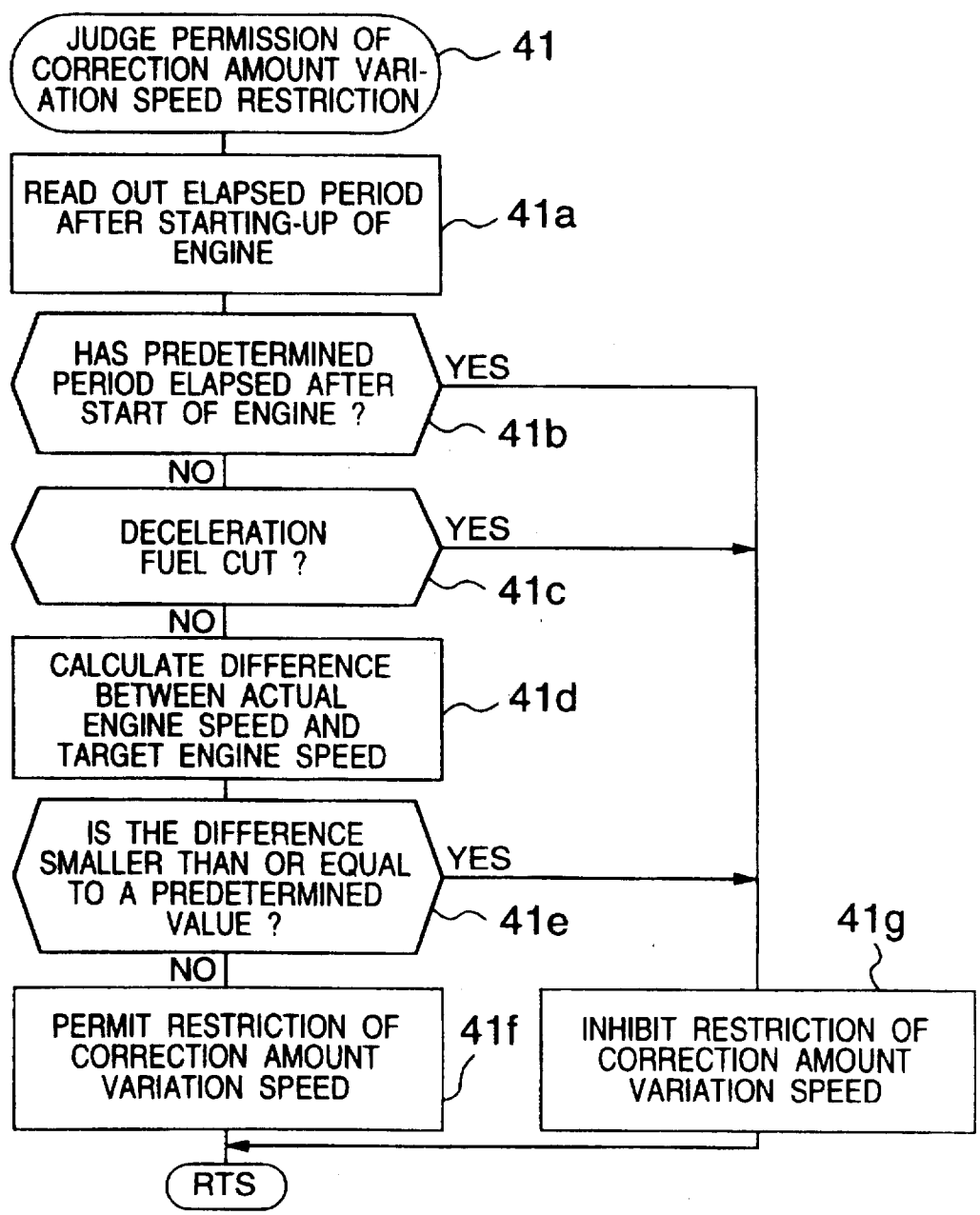
FIG. 10 is a flowchart showing a procedure of judgment of actuation enabling of restriction of variation speed of correction amount under throttle valve fully closed position.

The process for making judgement whether actuation of the correction amount variation speed restricting unit at fully closed position of the throttle valve is to be permitted or not, at step 41 of the flowchart in FIG. 5, will be discussed with reference to FIG. 10. At first, at step 41a, an elapsed time from starting-up of the internal combustion engine is read out. At step 41b, if judgment is made that the elapsed time has not yet reached a predetermined period, the process is advanced to step 41g to inhibit actuation of the correction amount variation speed restricting unit.

On the other hand, when judgment is made that the elapsed period has reached the predetermined period, the process is advanced to step 41c to check whether the internal combustion engine is in deceleration in fuel cut state or not by the deceleration detecting unit. Under the condition where the engine speed is higher than or equal to the predetermined value, when the throttle valve open angle (or depression magnitude of the accelerator pedal) is smaller than or equal to a given value, or a value of intake vacuum is greater than or equal to a predetermined value (vacuum side), decelerating condition is judged. If judgment is made that the engine is in deceleration in fuel cut state at step 41c, the process is advanced to step 41g to inhibit actuation of the correction amount variation speed restricting unit.

On the other hand, when judgment is made that the engine is not in deceleration fuel cut state at step 41c, the process is advanced to step 41d to calculate a difference between the actual engine speed and the target engine speed. Then, at step 41e, the difference is checked whether it is smaller than or equal to a predetermined value or not. If judgment is made that the difference is smaller than or equal to the predetermined value, the process is advanced to step 41g to inhibit actuation of the correction amount variation speed restricting unit. After step 41g, the sequence of process to make judgment whether actuation of the correction amount variation speed restricting unit is to be permitted or not at step 41 goes end.

On the other hand, if judgment is made that the difference is not smaller than or equal to the predetermined value, the process is advanced to step 41f to permit actuation of the correction amount variation speed restricting unit. Then, the sequence of process to make judgment whether actuation of the correction amount variation speed restricting unit is to be permitted or not at step 41 goes end.

The process for restricting the correction amount variation speed in the fully closed position of the throttle valve, at step 43 of the flowchart in FIG. 5, will be discussed with reference to FIG. 5. At first, at step 43a, judgment is made whether the throttle valve is fully closed from the not fully closed or open position at the current timing, or not. If judgment is made that the throttle valve is fully closed from the not fully closed or open position at the current timing, the process is advanced to step 43b to initiate the correction amount variation speed restricting process. Then, the process is advanced to step 43c to perform restriction process for the correction amount variation speed.

On the other hand, when judgment is made that the current timing is not the timing, at which the position of the throttle valve is changed from the open position to the fully closed position, the process is advanced to step 43g. Since restriction of the correction amount variation sped is effected by restricting variation range of the correction amount in a predetermined period within a predetermined value, the predetermined period is counted at step 43g. When judgment is made that the predetermined period is not yet elapsed, at step 43h, the correction component IGNISC determined in the preceding cycle is held unchanged. Then, the sequence of process for restricting the correction amount variation speed in the fully closed position of the throttle valve goes end.

On the other hand, if judgment that the predetermined period has elapsed, is made at step 43h, the process is advanced to step 43c. At step 43c, if the value (IGNISCtbl) of the correction component as retrieved through table look-up at step 39 is a retarding side value beyond a value derived by subtracting an allowable maximum retarding correction amount variation (ΔIGNISCrtd) from the value (IGNISCold) of the correction component determined in the immediately preceding cycle (IGNISCtbl<IGNISCold−ΔIGNISCrtd), the process is advanced to step 43d to set the correction amount of the current cycle at a value corresponding to the allowable maximum retarding correction variation (IGNISCold−ΔIGNISCrtd). Then, the sequence of process goes end.

On the other hand, when judgment is made that IGNISCtbl is in advancing side than (IGNISCold−ΔIGNISCrtd) at step 43c, the process is advanced to step 43e to set IGNISCtbl as the correction component IGNISC. Thereafter, at step 43f, the process for restricting the correction amount variation speed is terminated, and the sequence of process goes end.

Figure 12:
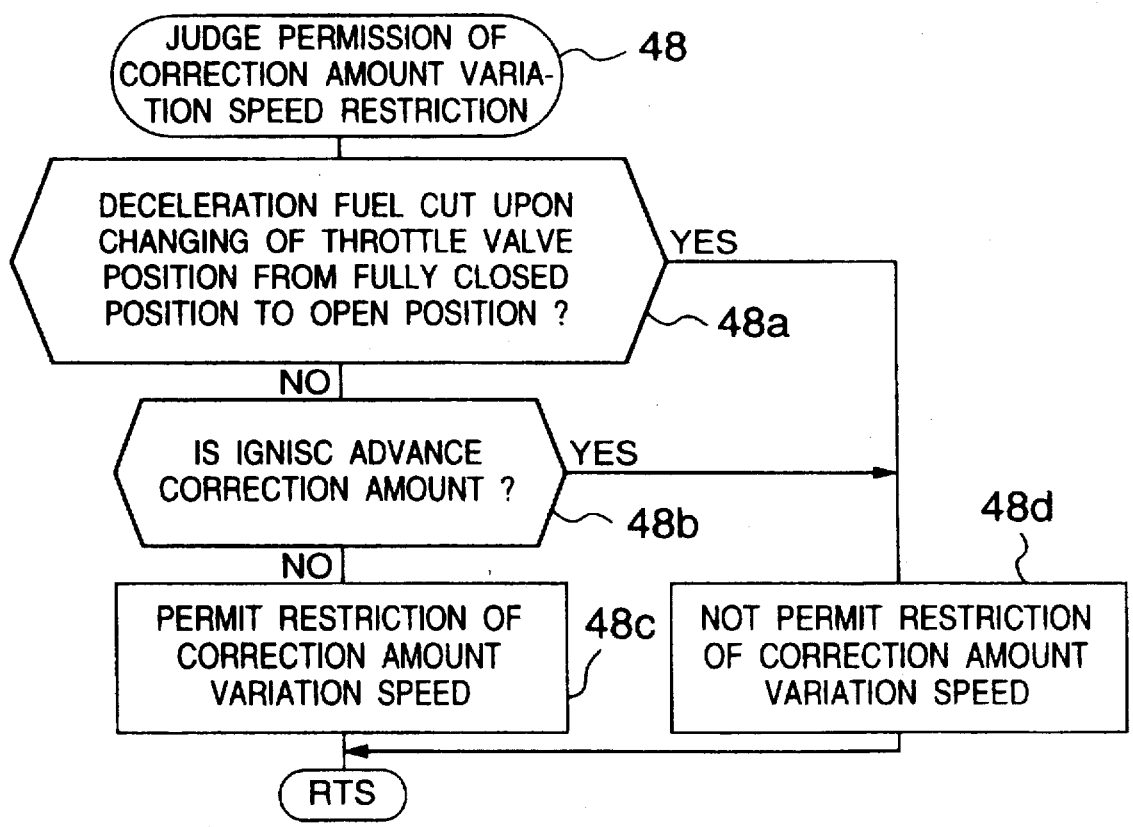
FIG. 12 is a flowchart showing a procedure of judgment for enabling actuation of restriction of variation speed of the correction amount under not fully closed position of the throttle valve.

The process for making judgement whether actuation of the correction amount variation speed restricting unit at open position of the throttle valve is to be permitted or not, at step 48 of the flowchart in FIG. 5, will be discussed with reference to FIG. 12. At first, at step 48a, judgment is made whether the deceleration fuel cut was in effect upon changing of position of the throttle valve from the fully closed position to the open position. If judgment is made that the deceleration fuel cut wan in effect, the process is advanced to step 48d to inhibit restriction of the correction amount variation speed. Then, the sequence of process for making judgement whether actuation of the correction amount variation speed restricting unit at open position of the throttle valve is to be permitted or not at step 48 goes end.

On the other hand, if judgment is made that the deceleration fuel cut was not in effect upon changing of the position of the throttle valve from the fully closed position to the open position, the process is advanced to step 48b to make judgment whether the correction component has advancing correction value or not. If judgment is made that the correction component contains the advancing correction value, the process is advanced to step 48d to inhibit restriction of the correction amount variation speed. Then, the sequence of process goes end.

On the other hand, when judgment is made that the correction component does not contains the advancing correction amount, restriction of the correction amount variation speed is permitted. Then, the sequence of process goes end.

Figure 13:
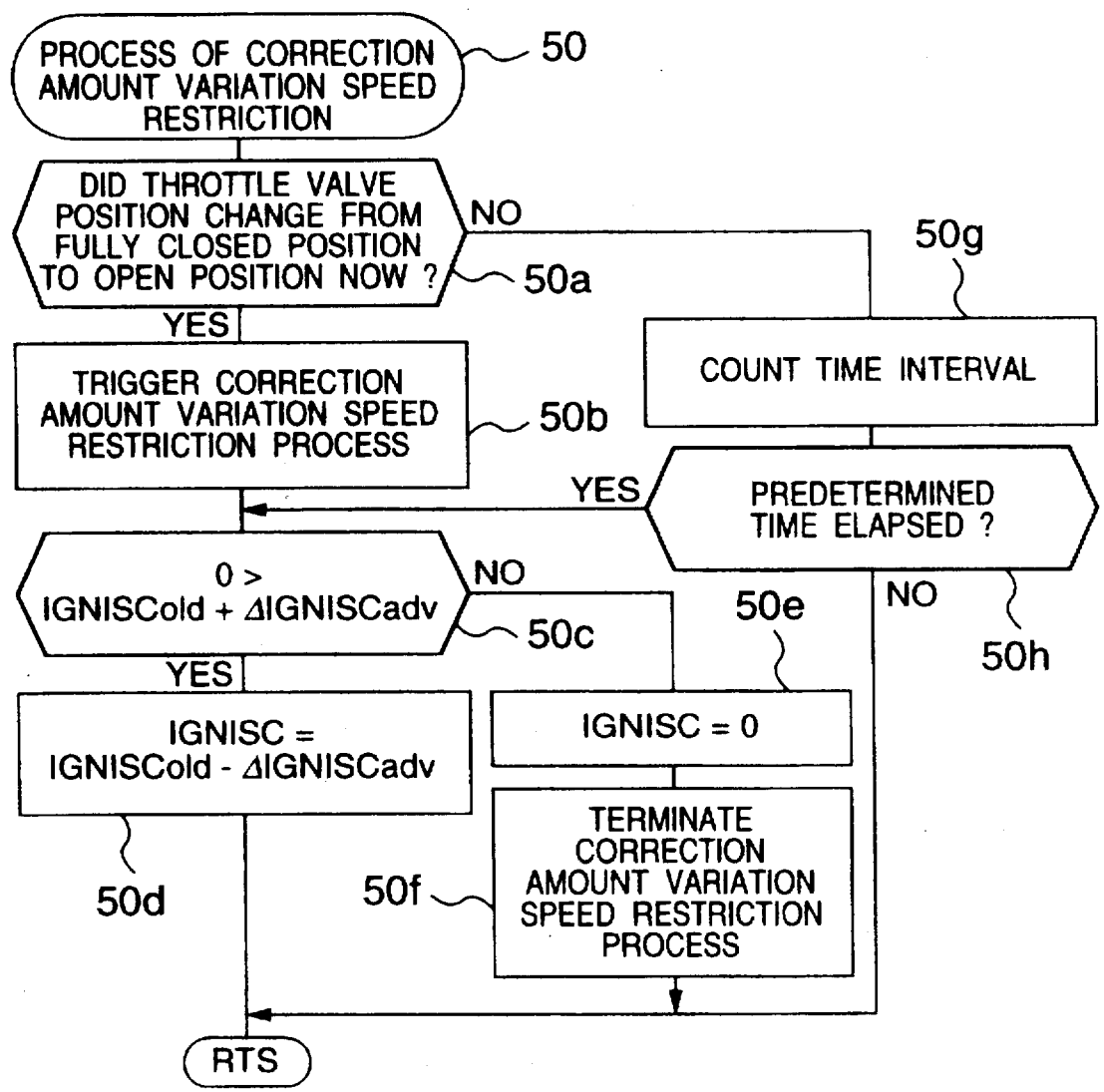
FIG. 13 is a flowchart showing a procedure of restriction of variation speed of the correction amount under not fully closed position of the throttle valve.

The process for restricting the correction amount variation speed in the open position of the throttle valve at step 50 of the flowchart in FIG. 5, will be discussed with reference to FIG. 13. At first, at step 50a, judgment is made whether the position of the throttle valve is changed from the fully closed to the open position at the current timing, or not. If judgment is made that the position of the throttle valve is changed from the fully closed to the open position at the current timing, the process is advanced to step 50b to initiate the correction amount variation speed restricting process. Then, the process is advanced to step 50c to perform restriction process for the correction amount variation speed. On the other hand, when judgment is made that the current timing is not the timing, at which the position of the throttle valve is changed from the fully closed position to the open position, the process is advanced to step 50g. Similarly to the process of FIG. 11, since restriction of the correction amount variation sped is effected by restricting variation range of the correction amount in a predetermined period within a predetermined value, the predetermined period is counted at step 50g. When judgment is made that the predetermined period is not yet elapsed, at step 50h, the correction component IGNISC determined in the preceding cycle is held unchanged. Then, the sequence of process for restricting the correction amount variation speed in the open position of the throttle valve goes end.

On the other hand, if judgment that the predetermined period has elapsed, is made at step 50h, the process is advanced to step 50c. At step 50c, if the value calculated by adding an allowable maximum advancing correction value variation (ΔIGNISCadv) to the correction amount (IGNISCold) derived in the immediately preceding cycle, is in retarding side than zero (0>IGNISCold+ΔIGNISCadv), the process is advanced to step 50d to set the current correction amount of the correction component at a value corresponding to the allowable maximum advancing correction amount variation (IGNISCold+ΔIGNISCadv). Then, the sequence of process goes end.

On the other hand, when the value (IGNISCold+ΔIGNISCadv) is in advancing side than zero at step 50c, the correction amount of the correction component IGNISC is set to zero at step 50e. Then, at step 50f, the process of restriction of the correction amount variation speed is terminated, and then the sequence of process goes end.

A process of fail-safe control will be discussed with reference to FIG. 14. The shown process is triggered at every predetermined period and executed repeatedly. At first, at step 80, the parameters indicative of the driving condition of the internal combustion engine is read out in the similar manner to that of the step 30 of FIG. 5. Next, at step 81, the value of the correction component IGNISC is read out. At step 82, check is performed whether the read out value of the correction component IGNISC is maintained for a period longer than or equal to a predetermined period, and thus to check whether the retarding magnitude greater than or equal to the predetermined value is maintained or not. If not maintained, judgement is made that no problem is occurring. Then, the sequence of process for fail-safe control goes end. Then, the process is placed in stand-by state until the next trigger timing.

On the other hand, when judgment is made that the value of the correction component IGNISC is maintained for the period longer than or equal to the predetermined period and that the retarding magnitude greater than or equal to the predetermined value is maintained at step 82, the value of the correction component IGNISC is forcedly set to zero for preventing exhaust temperature from elevating abnormally.

When the condition where the correction component IGNISC is forcedly set at zero, the engine speed can be accelerated. Therefore, if judgment is made that the engine speed is held higher than or equal to a predetermined speed for a period longer than or equal to the predetermined period at step 84, fuel supply for the internal combustion engine is cut off by the air/fuel ratio adjusting unit. Then, the sequence of process goes end and wait for the next trigger timing.

On the other hand, when judgment is made that the engine speed higher than or equal to the predetermined speed is not maintained for the period longer than or equal to the predetermined period, judgment is made that no problem is occurring. Then, the sequence of process for fail-safe control goes end and wait for the next trigger timing.

With the shown embodiment of the present invention as discussed hereinabove achieves the following technical effects.

The engine speed can be quickly controlled to the target engine speed with avoiding abnormal advance of the ignition timing which can occur immediately after starting-up of the engine otherwise.

A period to maintain the engine speed of the internal combustion engine higher than the target engine speed can be optically controlled so that the engine speed of the internal combustion engine can be controlled without giving abnormal feeling due to high idling speed or so forth to the driver.

Even when the engine start-up characteristics is degraded due to heavy gasoline or so forth, the engine speed of the internal combustion engine can be quickly controlled to the target engine speed.

Even when a delay period is erroneously set for the excessively long period, and the engine start-up characteristics is degraded due to heavy gasoline or so forth, the engine speed of the internal combustion engine can be quickly controlled to the target engine speed.

Both of good vehicle start-up characteristics and controllability of the engine speed of the internal combustion engine can be achieved.

With avoiding influence of friction of the internal combustion engine, even when the engine start-up characteristics is degraded due to heavy gasoline or so forth, the engine speed of the internal combustion engine can be quickly controlled to the target engine speed.

At the transition of initiating and terminating ignition timing correction, abrupt variation of the ignition timing to cause degradation of drivability can be successfully prevented.

In the deceleration state before shutting off fuel supply to the internal combustion engine, excessive retarding of ignition timing to cause degradation combustion of the internal combustion engine can be successfully avoided.

The engine speed of the internal combustion engine can be controlled toward the target engine speed, and in conjunction therewith, even upon re-acceleration from fuel cut state shutting off fuel supply for the internal combustion engine during deceleration, stable controllability of the ignition timing can be obtained irrespective of the period to maintain the fuel cut state.

Degradation of drivability in acceleration from idling can be prevented.

Abrupt drop of the engine speed during deceleration can be certainly avoided.

The internal combustion engine can be certainly controlled without causing degradation of acceleration performance.

It becomes possible to avoid maintaining of the engine idling speed at elevated speed for a long period due to some abnormality to continue retarding correction of the ignition timing to result in elevation of the exhaust temperature to damage parts in the exhaust system.

Abrupt drop of the engine speed leading degradation of drivability can be avoided, and even when the engine start-up characteristics is degraded due to heavy gasoline or so forth, the engine speed of the internal combustion engine can be quickly controlled to the target engine speed.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, in the embodiment set forth above, the output of the throttle angle sensor is used for detecting the engine idling condition. However, the engine idling condition can be detected in other ways. For example, by providing a switch which can detect depression magnitude of the accelerator pedal, the idling condition may be judged when not depressed condition of the accelerator pedal is detected by such switch. Other methods for detecting the engine idling condition may be applicable for the present invention.

What is claimed is:

1. An ignition timing control system for an internal combustion engine comprising:
   basic ignition timing setting means for setting a basic ignition timing of the engine;
   means for setting a target value of an engine speed while the engine is in idling condition;
   correcting means for determining an ignition timing correction value depending upon a difference between said target value and a detected engine speed and correcting the basic ignition timing with said ignition timing correction value; and
   control means for controlling said engine with the corrected ignition timing after the engine speed becomes higher than or equal to a predetermined value.

2. An ignition timing control system as set forth in claim 1, which further includes means for detecting the idling condition of the engine.

3. An ignition timing control system as set forth in claim 2, wherein said means for detecting engine idling condition includes a sensor for detecting an open angle of a throttle valve and means for making judgment that the engine is in idling condition when the throttle valve open angle representative of closed condition is detected.

4. An ignition timing control system as set forth in claim 2, wherein said means for detecting engine idling condition includes an accelerator pedal for operating a throttle valve, an accelerator sensor for detecting whether the accelerator pedal is depressed or not, and means for making judgement that the engine is in idling condition when the accelerator pedal is not depressed.

5. An ignition timing control system as set forth in claim 1, wherein said correction is initiated with a further time delay after the engine speed of the internal combustion engine once reaches the predetermined value.

6. An ignition timing control system as set forth in claim 5, wherein said time delay is set depending upon an elapsed time after the engine speed of the internal combustion engine once reached the predetermined value.

7. An ignition timing control system as set forth in claim 5, wherein said time delay is set based on a parameter value indicative of integrated value of an intake vacuum of the internal combustion engine.

8. An ignition timing control system for an internal combustion engine comprising:

basic ignition timing setting means for setting a basic ignition timing of the engine;

driving condition detecting means including a sensor for detecting an engine speed;

means for setting a target value of an engine speed while the engine is in idling condition;

correcting means for determining an ignition timing correction value depending upon a difference between said target value and a detected engine speed and correcting the basic ignition timing with said ignition timing correction value;

monitoring means for detecting variation speed of taking-up of the engine speed upon starting-up of said engine; and control means for controlling said engine with the corrected ignition timing after the engine speed becomes higher than or equal to a predetermined value.

9. An ignition timing control system as set forth in claim 8, which further includes means for detecting the idling condition of the engine.

10. An ignition timing control system as set forth in claim 9, wherein said means for detecting engine idling condition includes a sensor for detecting an open angle of a throttle valve and means for making judgment that the engine is in idling condition when the throttle valve open angle representative of closed condition is detected.

11. An ignition timing control system as set forth in claim 9, wherein said means for detecting engine idling condition includes an accelerator pedal for operating a throttle valve, an accelerator sensor for detecting whether the accelerator pedal is depressed or not, and means for making judgement that the engine is in idling condition when the accelerator pedal is not depressed.

12. An ignition timing control system as set forth in claim 8, wherein said ignition timing correcting means enables initiation of correction of the ignition timing after the engine speed once reaches a predetermined value, and the gone is controlled with the corrected ignition timing when a variation speed of the engine speed at starting-up of the engine is lower than a predetermined value.

13. An ignition timing control system as set forth in claim 1, wherein said ignition timing correcting means generates a correction value for retarding the ignition timing from said basic ignition timing when said engine speed is higher than said target value, for advancing the ignition timing from said basic ignition timing when said engine speed is lower than said target value, and for not to effect correction or to retard from said basic ignition timing when said engine speed is lower than said target value and a difference between is greater than or equal to said predetermined value.

14. An ignition timing control system as set forth in claim 13, wherein said ignition timing control means provides a correction restricting period wherein the timing correction to retarding direction is restricted or the timing correction is inhibited when the engine speed is lower than the target speed and the difference therebetween is not less than a predetermined value while a predetermined time is not elapsed after the start of the engine.

15. An ignition timing control system as set forth in claim 14, wherein said ignition timing correcting means determines said correction restricting period depending upon a parameter value indicative of a friction of said engine.

16. An ignition timing control system as set forth in claim 1, which further comprises correction amount variation speed restricting means sets variation amount of an ignition timing correction amount per predetermined period or per predetermined engine speed to a maximum variation amount, when said ignition timing correction amount is greater than said maximum variation amount.

17. An ignition timing control system as set forth in claim 16, wherein said correction amount variation speed restricting means triggers when said engine condition is changed into the idling state for gradually increasing said correction amount of said ignition timing correction to attain a predetermined characteristics depending upon said engine speed and said target value.

18. An ignition timing control system as set forth in claim 17, which further comprises inhibiting means for disabling said correction amount variation speed restricting means during a period up to elapsing of a predetermined period after starting-up of said engine, a period while said engine is in deceleration state, or a period while said engine is in operation at the engine speed corresponding to said target value.

19. An ignition timing control system as set forth in claim 18, wherein said correction amount variation speed restricting means is triggered when said engine is changed the state from the idling condition to other condition, for gradually reducing said correction amount from a predetermined characteristics to zero depending upon the difference between said target value and said engine speed when the engine is not in deceleration state upon triggering and ignition timing correcting is retarding correction.

20. An ignition timing control system as set forth in claim 1, which further comprises:

means for detecting variation of lowering speed of said engine speed, and correction restricting means for restricting the correction value of said ignition timing or inhibiting correction when said engine speed is higher than the predetermined speed while said lowering speed variation is greater than or equal to the predetermined value.

21. An ignition timing control system for an internal combustion engine comprising:

basic ignition timing setting means for setting a basic ignition timing of the engine;

driving condition detecting means including a sensor for detecting an engine speed;

means for setting a target value of an engine speed while the engine is in idling condition;

correcting means for determining an ignition timing correction value depending upon a difference between said target value and a detected engine speed and correcting the basic ignition timing with said ignition timing correction value;

monitoring means for detecting variation speed of taking-up of the engine speed upon starting-up of said engine;

correction amount variation speed restricting means for setting variation of said ignition timing correction amount to said maximum variation amount when variation amount of said ignition timing correction amount per predetermined period or per predetermined engine speed is greater than predetermined maximum variation amount;

means for detecting lowering speed variation of said engine speed; and correction restricting means for restricting the correction amount of said ignition timing or inhibiting correction when said lowering speed variation is greater than or equal to the predetermined value and said engine speed is higher than said predetermined engine speed, said correction restricting means preferentially functioning before operation of said correction amount variation speed restricting means.

22. An ignition timing control system as set forth in claim 21, which further includes means for detecting the idling condition of the engine.

23. An ignition timing control system as set forth in claim 22, wherein said means for detecting engine idling condition includes a sensor for detecting an open angle of a throttle valve and means for making judgment that the engine is in idling condition when the throttle valve open angle representative of closed condition is detected.

24. An ignition timing control system as set forth in claim 22, wherein said means for detecting engine idling condition includes an accelerator pedal for operating a throttle valve, an accelerator sensor for detecting whether the accelerator pedal is depressed or not, and means for making judgement that the engine is in idling condition when the accelerator pedal is not depressed.

25. An ignition timing control system as set forth in claim 1, which further comprises one of valve open speed detecting means for detecting valve opening speed of a throttle valve of said engine, load increasing speed detecting means for detecting increasing speed of an engine load, and engine speed variation detecting means for detecting increasing speed of the engine speed, acceleration judgment means for detecting accelerating state of the engine on the basis of the result of detection of any one of said valve open speed detecting means, said load increasing speed detecting means and said engine speed variation detecting means, and correction restricting means for restricting correction amount or inhibiting correction when accelerating condition is judged.

26. An ignition timing control system as set forth in claims 25, which further comprises one of valve open speed detecting means for detecting valve opening speed of a throttle valve of said engine, load increasing speed detecting means for detecting increasing speed of an engine load, and engine speed variation detecting means for detecting increasing speed of the engine speed, acceleration judgment means for detecting accelerating state of the engine on the basis of the result of detection of any one of said valve open speed detecting means, said load increasing speed detecting means and said engine speed variation detecting means, and correction restricting means for restricting correction amount or inhibiting correction when accelerating condition is judged.

27. An ignition timing control system for an internal combustion engine comprising:

basic ignition timing setting means for setting a basic ignition timing of the engine;

driving condition detecting means including a sensor for detecting an engine speed;

means for setting a target value of an engine speed while the engine is in idling condition;

correcting means for determining an ignition timing correction value depending upon a difference between said target value and a detected engine speed and correcting the basic ignition timing with said ignition timing correction value;

monitoring means for detecting variation speed of taking-upon of the engine speed upon starting-up said engine;

correction amount variation speed restricting means for setting variation of said ignition timing correction amount to said maximum variation amount when variation amount of said ignition timing correction amount per predetermined period or per predetermined engine speed is greater than predetermined maximum variation amount;

one of valve open speed detecting means for detecting valve opening speed of a throttle valve of said engine, load increasing speed detecting means for detecting increasing speed of an engine load, and engine speed variation detecting means for detecting increasing speed of the engine speed;

acceleration judgment means for detecting accelerating state of the engine on the basis of the result of detection of any one of said valve open speed detecting means, said load increasing speed detecting means and said engine speed variation detecting means, and correction restricting means for restricting correction amount or inhibiting correction when accelerating condition is judged; and correction restricting means for restricting the correction amount of said ignition timing or inhibiting correction when said lowering speed variation is greater than or equal to the predetermined value and said engine speed is higher than said predetermined engine speed, said correction restricting means preferentially functioning before operation of said correction amount variation speed restricting means.

28. An ignition timing control system as set forth in claim 27, which further includes means for detecting the idling condition of the engine.

29. An ignition timing control system as set forth in claim 28, wherein said means for detecting engine idling condition includes a sensor for detecting an open angle of a throttle valve and means for making judgment that the engine is in idling condition when the throttle valve open angle representative of closed condition is detected.

30. An ignition timing control system as set forth in claim 28, wherein said means for detecting engine idling condition includes an accelerator pedal for operating a throttle valve, an accelerator sensor for detecting whether the accelerator pedal is depressed or not, and means for making judgement that the engine is in idling condition when the accelerator pedal is not depressed.

31. An ignition timing control system as set forth in claim 1, which further comprises fail-safe means for restricting said ignition timing correction amount, inhibiting correction or adjusting air/fuel ratio of a mixture to be supplied to said engine when the retarding correction amount of the ignition timing of greater than or equal to a predetermined value and said retarding correction value is maintained for a period longer than or equal to a predetermined period.

32. An ignition timing control system as set forth in claim 24, which further comprises fail-safe means for restricting said ignition timing correction amount, inhibiting correction or adjusting air/fuel ratio of a mixture to be supplied to said engine when the retarding correction amount of the ignition timing of greater than or equal to a predetermined value and said retarding correction value is maintained for a period longer than or equal to a predetermined period.

33. An ignition timing control system as set forth in claim 31, which further comprises fail-safe means for restricting said ignition timing correction amount, inhibiting correction or adjusting air/fuel ratio of a mixture to be supplied to said engine when the retarding correction amount of the ignition timing of greater than or equal to a predetermined value and said retarding correction value is maintained for a period longer than or equal to a predetermined period.

34. A method for controlling an ignition timing of an internal combustion engine comprising the steps of:

setting a basic ignition timing of the engine;

detecting an engine speed;

setting a target value of the engine speed when the engine is in idling condition;

determining an ignition timing correction value detecting upon a difference between said target value and the engine speed while the engine is in idling condition;

correcting the value of said basic ignition timing with said correction value; and controlling the engine with the corrected ignition timing when the engine speed becomes higher than or equal to a predetermined value.

35. An ignition timing control method as set forth in claim 34, which further includes a step of detecting the idling condition of the engine, said idling condition detecting step includes steps of detecting valve open angle of a throttle valve, and making judgment that the engine is in idling condition when the valve open angle representative of closing condition of the throttle valve is detected.

36. An ignition timing control method as set forth in claim 34, which further includes a step of detecting idling condition of the engine, said idling condition detecting step includes steps of detecting whether an accelerator pedal for operating a throttle valve is depressed or not and making judgment that the engine is in idling condition when the accelerator pedal not depressed is detected.

* * * * *